United States Patent
Deseure et al.

(10) Patent No.: US 10,510,243 B2
(45) Date of Patent: Dec. 17, 2019

(54) METHOD FOR PROCESSING AN ERROR WHEN PERFORMING A PREDETERMINED AVIONICS PROCEDURE, RELATED COMPUTER PROGRAM AND DETECTION AND ALERT SYSTEM

(71) Applicant: THALES, Courbevoie (FR)

(72) Inventors: Chris Deseure, Toulouse (FR); Laurent Flotte, Toulouse (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 16/148,834

(22) Filed: Oct. 1, 2018

(65) Prior Publication Data

US 2019/0114906 A1   Apr. 18, 2019

(30) Foreign Application Priority Data

Oct. 17, 2017   (FR) .................................... 17 01080

(51) Int. Cl.
*G08B 29/18*    (2006.01)
*G05B 23/02*    (2006.01)
(Continued)

(52) U.S. Cl.
CPC ........... *G08B 29/186* (2013.01); *B64D 45/00* (2013.01); *G05B 23/0205* (2013.01);
(Continued)

(58) Field of Classification Search
CPC ... G08B 29/186; B64D 45/00; G06F 11/0739; G06F 11/0751; G06F 11/28; G06F 11/0775; G06F 11/0793; G05B 23/0205
See application file for complete search history.

(56) References Cited

U.S. PATENT DOCUMENTS 5,050,086 A * 9/1991 Lambregts ............. G05D 1/085
                                                         244/179
5,111,400 A * 5/1992 Yoder ........................ G01S 7/22
                                                         342/29
(Continued)

FOREIGN PATENT DOCUMENTS

EP    2 386 054    11/2011
FR    2 940 482    6/2010
(Continued)

OTHER PUBLICATIONS

Preliminary Search Report dated Jun. 29, 2018, received in FR 1701080, filed Oct. 17, 2017.

*Primary Examiner* — Hoi C Lau
(74) *Attorney, Agent, or Firm* — Knobbe Martens Olson & Bear LLP

(57) ABSTRACT

A method for processing an error when performing a predetermined avionics procedure, related computer program and detection and alert system is disclosed. In one aspect, the method is carried out automatically by the detection and alert system of an aircraft, the method including monitoring the operation of one or several avionics device(s) of the aircraft, the monitoring based on the tracking of a sequence representative of the predetermined avionics procedure being carried out. The method further includes: detecting a break of the sequence due to an incorrect command and/or skipping of at least one expected command according to the predetermined avionics procedure being performed, and retrieving at least one piece of information representative of the break in the sequence.

7 Claims, 7 Drawing Sheets

(51) Int. Cl.
*G06F 11/07* (2006.01)
*G06F 11/28* (2006.01)
*B64D 45/00* (2006.01)

(52) U.S. Cl.
CPC ...... *G06F 11/0739* (2013.01); *G06F 11/0751* (2013.01); *G06F 11/28* (2013.01); *G06F 11/0775* (2013.01); *G06F 11/0793* (2013.01); *G06F 2201/805* (2013.01)

(56) References Cited

U.S. PATENT DOCUMENTS

| | | | | |
|---|---|---|---|---|
| 5,894,323 | A * | 4/1999 | Kain | G01C 11/02 348/116 |
| 6,367,031 | B1 * | 4/2002 | Yount | G05B 9/03 700/4 |
| 7,006,032 | B2 * | 2/2006 | King | G01S 3/023 342/29 |
| 7,567,862 | B2 * | 7/2009 | Pelton | B64D 45/0005 701/33.8 |
| 8,185,255 | B2 * | 5/2012 | Lavretsky | G05D 1/0825 244/75.1 |
| 8,774,986 | B1 * | 7/2014 | Theriault | G05D 1/0661 701/1 |
| 9,087,452 | B2 * | 7/2015 | del Pozo de Poza | G06Q 10/047 |
| 9,527,588 | B1 * | 12/2016 | Rollefstad | B64C 39/024 |
| 9,533,752 | B2 * | 1/2017 | Yeh | G06F 11/0739 |
| 10,223,925 | B2 * | 3/2019 | Cutler | G05D 1/0676 |
| 10,338,585 | B2 * | 7/2019 | Burte | G05D 1/0077 |
| 2003/0182043 | A1 * | 9/2003 | Christiansen | G05B 19/0421 701/49 |
| 2004/0003318 | A1 * | 1/2004 | Felke | G05B 23/0216 714/25 |
| 2005/0156777 | A1 * | 7/2005 | King | G01S 3/023 342/29 |
| 2006/0004505 | A1 * | 1/2006 | Christiansen | G05B 19/0421 701/49 |
| 2008/0072099 | A1 * | 3/2008 | Johansson | G06F 11/2097 714/1 |
| 2009/0048689 | A1 * | 2/2009 | Pelton | B64D 45/0005 700/33 |
| 2009/0143925 | A1 * | 6/2009 | Lavretsky | G05D 1/0825 701/3 |
| 2013/0124016 | A1 * | 5/2013 | Schaeffer | G05B 23/0221 701/3 |
| 2013/0317733 | A1 * | 11/2013 | del Pozo de Poza | G06Q 10/047 701/301 |
| 2015/0217856 | A1 * | 8/2015 | Mesguen | B64C 19/00 701/3 |
| 2015/0253779 | A1 * | 9/2015 | Navarro | G05D 1/101 701/14 |
| 2016/0016655 | A1 * | 1/2016 | Yeh | G06F 11/0739 701/3 |
| 2016/0194074 | A1 * | 7/2016 | Hagerott | B64C 13/16 701/5 |
| 2016/0202701 | A1 * | 7/2016 | Burte | G05D 1/0077 701/3 |
| 2016/0216849 | A1 * | 7/2016 | Kawalkar | G06F 3/0482 |
| 2017/0174323 | A1 * | 6/2017 | Roberts | B64C 11/48 |
| 2017/0211600 | A1 * | 7/2017 | Smith | F15B 20/005 |
| 2017/0227377 | A1 * | 8/2017 | Navarro | G01C 23/00 |
| 2018/0040171 | A1 * | 2/2018 | Kundu | G07C 5/008 |
| 2018/0254844 | A1 * | 9/2018 | Chretien | B64C 39/024 |
| 2019/0042376 | A1 * | 2/2019 | Babazadeh | G06F 11/184 |
| 2019/0114906 | A1 * | 4/2019 | Deseure | G05B 23/0205 |

FOREIGN PATENT DOCUMENTS

| | | |
|---|---|---|
| FR | 3 033 637 | 9/2016 |
| WO | WO 2010/080656 | 7/2010 |

* cited by examiner

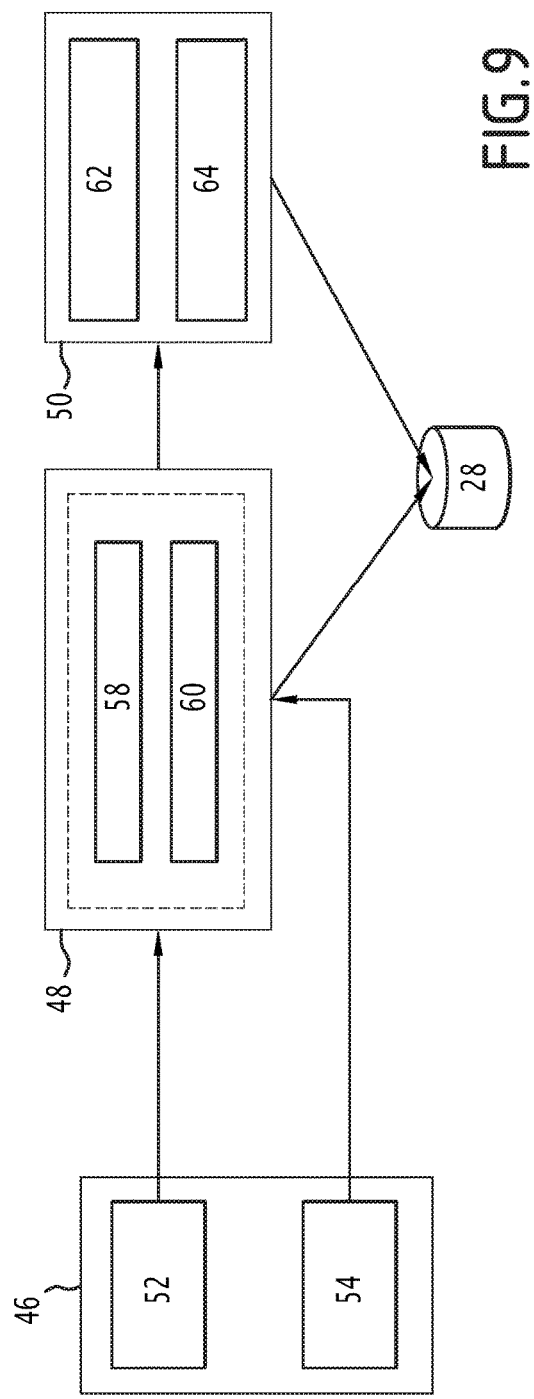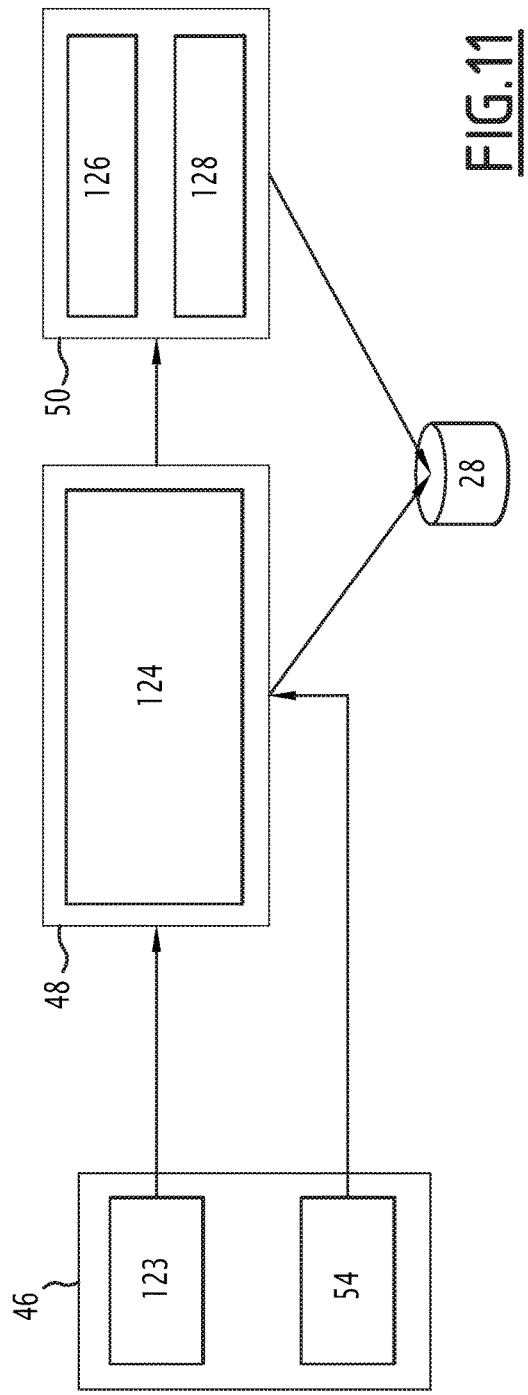

METHOD FOR PROCESSING AN ERROR WHEN PERFORMING A PREDETERMINED AVIONICS PROCEDURE, RELATED COMPUTER PROGRAM AND DETECTION AND ALERT SYSTEM

CROSS-REFERENCE TO RELATED APPLICATIONS

This patent application claims the benefit under 35 U.S.C. § 119 of French Application No. FR 17 01080 filed on Oct. 17, 2017 which is hereby incorporated by reference in its entirety.

BACKGROUND

Technological Field

The described technology relates to a method for processing an error when performing a predetermined avionics procedure, the method being carried out automatically by a detection and alert system of an aircraft, the method comprising the monitoring of the operation of one or several device(s) of the aircraft, the monitoring being based on the tracking of a sequence representative of the predetermined avionics procedure being carried out.

The described technology also relates to a computer program product comprising software instructions which, when implemented by an information processing unit integrated into a detection and alert system of an aircraft, implements such a processing method.

The described technology also relates to a detection and alert system of an aircraft comprising a module for monitoring the operation of one or several avionics device(s) of the aircraft, the monitoring module being capable of being connected to a module for tracking a sequence representative of a predetermined avionics procedure being carried out.

The described technology applies to the field of avionics, and more particularly to that of detection and alert systems (FWS for "Flight Warning Systems") of an aircraft, such as an airplane or helicopter.

Description of the Related Technology

Traditionally, detection and alert systems serve a dual purpose, namely on the one hand to alert the pilot when an abnormal flight situation arises, and on the other hand to present the pilot with the procedure(s) making it possible to address the failure associated with the abnormal situation to return to a controlled situation guaranteeing the safety of the flight and the return of the aircraft to the ground.

In current aircraft, the management of the procedures is provided electronically by a procedure management module of the detection and alert system. More specifically, currently, such a procedure management module retrieves one or several avionics procedures to be followed based on the current flight phase and/or based on the abnormal flight situation encountered, each procedure being made up of a sequence of instructions to be followed for the proper progression of the procedure.

The crew reads the restored procedure(s), and performs the actions (i.e., sends commands) corresponding to each instruction on the avionics devices of the aircraft. The crew next acknowledges each performed instruction, or according to one alternative, the detection and alert system is capable of monitoring the status of the systems with which the crew has interacted and as a result, the detection and alert system itself is capable of performing such an acknowledgment.

However, the handling scenario of such an acknowledgment is of little importance; the fact nevertheless remains that if an incorrect action or command is sent to one of the avionics devices, currently, it is up to the crew to recognize the error.

In other words, the current detection and alert systems are not able to detect whether an action or a command is inappropriate in the context of the procedure being performed. Indeed, the current detection and alert systems are only capable of providing continuous monitoring of the nominal or downgraded states of the avionics devices. Nevertheless, this monitoring does not make it possible to identify whether the detected state is appropriate for the situation.

Hereinafter, "inappropriate command" refers on the one hand to a command error associated with a fault by the crew corresponding to the performance by the crew of an incorrect action in place of the expected action, or forgetting an action in the sequence of actions to be performed, and on the other hand a command error associated with a failure of the command interface for example corresponding to the absence or delay in sending the command corresponding to the action by the crew, the lack of correspondence between the sent command and the action by the crew, or the sending of a multitude of commands while the action by the crew only required one.

SUMMARY OF CERTAIN INVENTIVE EMBODIMENTS

The effects of an incorrect command are varied and more or less easily detectable depending on the criticality of the procedure, the impact of the incorrect command on the performance of the aircraft, the time needed to correct the error, the nature of the error (human, failure of the command interface).

The identification of an incorrect command carried out by the crew is therefore not guaranteed and compromised even more in a stressful situation faced with an abnormal situation or a heavy workload (in particular in case of multiple failures, for example).

Thus, one inventive aspect of the described technology is therefore to offset the detection errors and errors involving human correction of incorrect commands by proposing automated assistance (i.e., without human intervention) to optimize their management and make it possible to improve the safety and tranquility of a crew if an abnormal flight situation arises.

To that end, in another aspect, the described technology relates to a method for processing an error when performing a predetermined avionics procedure, the method being carried out automatically by a detection and alert system of an aircraft, the method comprising the monitoring of the operation of one or several avionics device(s) of the aircraft, the monitoring being based on the tracking of a sequence representative of the predetermined avionics procedure being carried out, the method further comprising the following steps carried out automatically by the detection and alert system of the aircraft:

the detection of a break of said sequence due to an incorrect command and/or skipping of at least one expected command according to the predetermined avionics procedure being performed, the retrieval of at least one piece of information representative of said break in the sequence, the monitoring of the operation of one or several avionics device(s) of the aircraft corresponding to the monitoring of real-time states of said avionics device(s), and the detection comprising a comparison of the real-time states of one or several avionics device(s) of the aircraft with at least one of the following elements:

a set of prohibited states, associated with the predetermined avionics procedure, and stored in a first dedicated memory space;

a set of expected states, based on the performance moment of the sequence representative of the avionics procedure, the set of expected states being stored in a second dedicated memory space, and when the comparison of the real-time states and the set of prohibited states is positive, the retrieved representative information corresponds to a first alert comprising a first triplet of data respectively representative of:

the predetermined procedure, the detected prohibited state from among the real-time states, and a command to be performed recommended to offset the detected prohibited state, or wherein the monitoring of the operation of one or several avionics device(s) of the aircraft corresponds to the monitoring of commands received in real time by said avionics device(s), and wherein the detection comprises a comparison of said commands received in real time with a set of expected commands, based on the performance moment of the sequence representative of the predetermined avionics procedure, the set of expected commands being stored in a third dedicated memory space.

According to specific embodiments, the display system has one or more of the following features, considered alone or according to any technically possible combinations:

when the comparison of the real-time states and the set of expected states is negative, the retrieved representative information corresponds to a second alert comprising a second triplet of data respectively representative of:

the predetermined procedure, the missing expected state from among the real-time states, and a recommended command to be performed to overcome the missing expected state or to reiterate at least one command associated with at least one previous step of the predetermined procedure;

in the first and/or second dedicated memory spaces, each respectively prohibited and/or expected state is automatically associated with a criticality level;

when the comparison of the commands received in real time and the set of expected commands is negative, the retrieved representative information corresponds to a third alert comprising a third triplet of data respectively representative of:

the predetermined procedure, an unexpected command and/or a missing command from among the commands received in real time, and a command to be performed recommended to offset the unexpected and/or missing command, and wherein the method further comprises a time delay for:

the performance of the unexpected command by retrieving a confirmation request for the unexpected command from the crew, and/or the retrieval of the information representative of said break in the sequence, by sending a request to enter the missing command;

the method comprises a prior step for building a database comprising at least one of said first, second, third dedicated memory spaces, by automatic learning or by implementing an inference engine.

In another aspect, the described technology also relates to a computer program product comprising software instructions which, when implemented by an information processing unit integrated into a detection and alert system of an aircraft, implements such a processing method as defined above.

In another aspect, the described technology also relates to a detection and alert system of an aircraft comprising a module for monitoring the operation of one or several avionics device(s) of the aircraft and for tracking a sequence representative of a predetermined avionics procedure being carried out, the detection and alert system being able to process an error during the performance of the predetermined avionics procedure, and further comprises:

a module for detecting a break of said sequence due to an incorrect command and/or due to a skipping of at least one expected command according to the predetermined avionics procedure being performed, a module for retrieving at least one piece of information representative of said break in the sequence, the monitoring of the operation of one or several avionics device(s) of the aircraft, implemented by the monitoring module, corresponding to the monitoring of real-time states of said avionics device(s), and the detection, carried out by the detection module, comprising a comparison of the real-time states of one or several avionics device(s) of the aircraft with at least one of the following elements:

a set of prohibited states, associated with the predetermined avionics procedure, and stored in a first dedicated memory space;

a set of expected states, based on the performance moment of the sequence representative of the avionics procedure, the set of expected states being stored in a second dedicated memory space, and when the comparison of the real-time states and the set of prohibited states is positive, the retrieved representative information corresponds to a first alert comprising a first triplet of data respectively representative of:

the predetermined procedure, the detected prohibited state from among the real-time states, and a command to be performed recommended to offset the detected prohibited state, or wherein the monitoring of the operation of one or several avionics device(s) of the aircraft, carried out by the monitoring module, corresponds to the monitoring of commands received in real time by said avionics device(s), and wherein the detection, carried out by the detection module, comprises a comparison of said commands received in real time with a set of expected commands, based on the performance moment of the sequence representative of the predetermined avionics procedure, the set of expected commands being stored in a third dedicated memory space.

BRIEF DESCRIPTION OF THE DRAWINGS

The described technology and its advantages will be better understood upon reading the following detailed description of one particular embodiment, provided solely as a non-limiting example, this description being done in reference to the appended drawings, in which:

FIGS. 9 and 10 are flowcharts respectively of a processing method and a data set associated with an avionics procedure to be used in order to detect a command error according to a first embodiment;

FIGS. 11 and 12 are flowcharts respectively of a processing method and a data set associated with an avionics procedure to be used in order to detect a command error according to a second embodiment.

DETAILED DESCRIPTION OF CERTAIN INVENTIVE EMBODIMENTS

Figure 1:
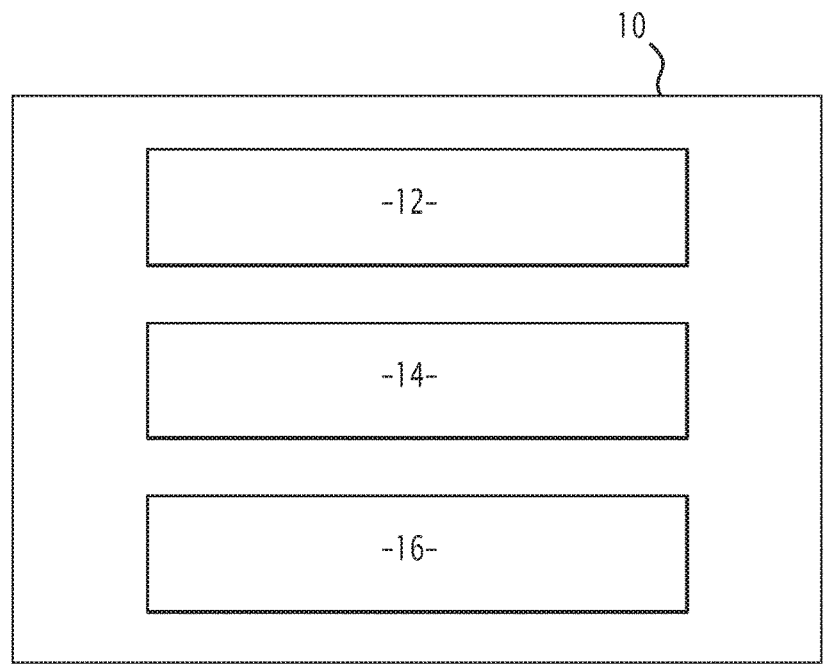
FIG. 1 is a general illustration, in the form of a block diagram, of the detection and alert system of an aircraft according to the described technology.

In reference to general FIG. 1, the detection and alert system 10 according to the described technology first traditionally comprises a module 12 for monitoring the operation of one or several avionics device(s) of the aircraft and for tracking a sequence representative of a predetermined avionics procedure being carried out.

More specifically, such a monitoring module 12 is first capable of performing an alert and context calculating function (i.e., procedure tracking). In particular, to carry out such a function, using the various physical data produced by the avionics devices equipping the aircraft as inputs, the monitoring module 12 produces a list of events (alerts, flight phase change, etc.) and also provides the state of the various avionics devices (i.e., pieces of equipment) of the aircraft and the various contexts (flight phases, ice conditions for example) as performed by a traditional detection and alert system by basing itself on combinations of mathematical and logic operators.

From the alerts and events detected above and also from various pilot inputs entered to navigate within procedures, such a monitoring module 12 is also able to carry out a procedure management function in particular consisting of presenting the pilot procedure to be carried out to the crew in order to allow it to track its proper progression.

More specifically, such a presentation for example consists of providing the identifier of the procedure and the sub-procedure being carried out, a sub-procedure being defined as a sequence of actions (i.e., a sequenced series of actions) not requiring any choice by the crew, indicating, through a visual (i.e., retrieval on a screen) or audio (i.e., using a speaker) interface, the actuator of the aircraft on which the crew must act (which corresponds to the "challenge") and further specifying the type of action (i.e., the expected command) to be performed on this actuator (which corresponds to the "response") and the associated time constraint to carry out such an action.

Furthermore, the monitoring module 12, capable of carrying out such a procedure management function, is also able to allow the crew to acknowledge the actions once the latter have been performed. Such an acknowledgment makes it possible inter alia to guarantee that the crew will have a correct view of the status of the procedure if the performance thereof is interrupted (in particular in case of request by the ground center, for example).

Optionally, according to a more automated version, the monitoring module 12 is capable of allowing the crew to perform the action directly and automatically from the presented avionics procedure.

In other words, an avionics procedure in progress depends on the criticality (capable of establishing an inter-event priority level) of the detected events and alerts and also the choices and actions of the crew.

Furthermore, if an event occurs with a priority level higher than the event associated with the avionics procedure being performed, the monitoring module 12 is capable of interrupting the avionics procedure in progress and automatically presenting an avionics procedure better suited to the higher priority event in terms of criticality.

However, the crew remains free to interact with the monitoring module 12 so as to modify the processing order of the actions of the procedures via a command interface.

According to the described technology, the detection and alert system 10 is specifically capable of processing an error during the performance of the predetermined avionics procedure by the crew, and to that end further comprises an automatic detection module 14 (i.e., without human intervention) for detecting a break in the sequence due to an incorrect command (for example entered by the crew or resulting from an automaton performing the sequence associated with the procedure in place of the crew 22), and/or skipping of at least one expected command according to the predetermined avionics procedure being performed, and a module 16 for retrieving at least one piece of information representative of the break in sequence.

Figure 2:
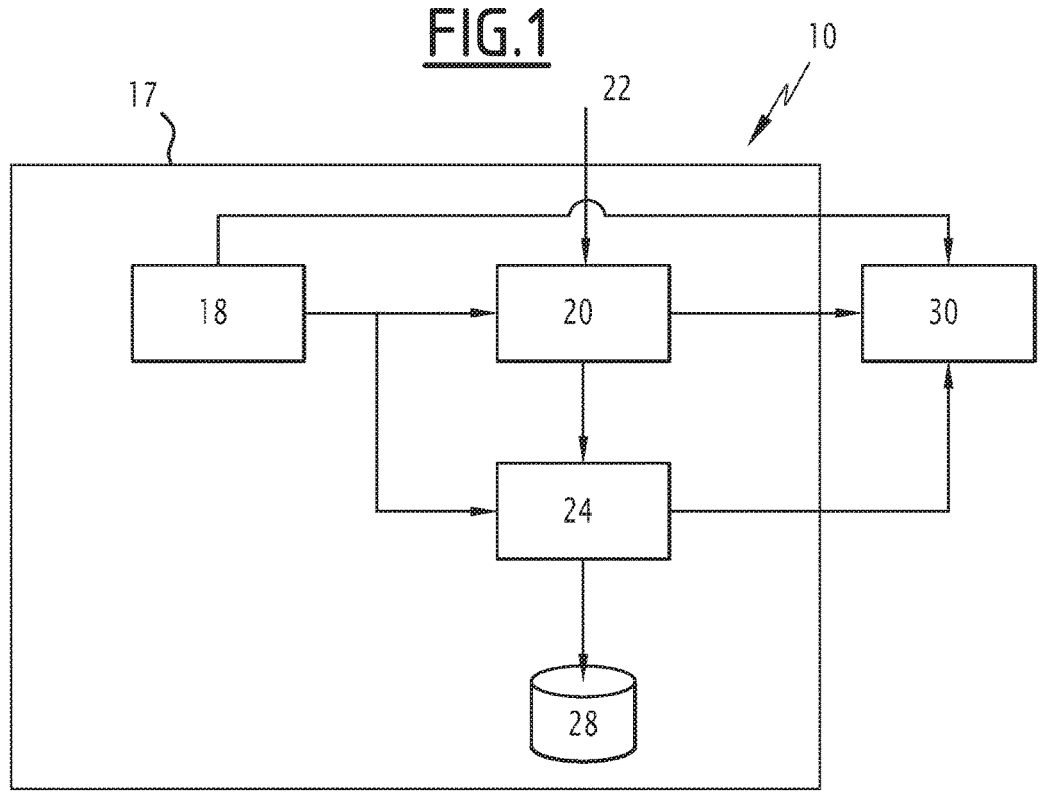
FIGS. 2 and 3 are illustrations of two alternatives of a detection and alert system of an aircraft according to a first embodiment of the described technology.
Figure 3:
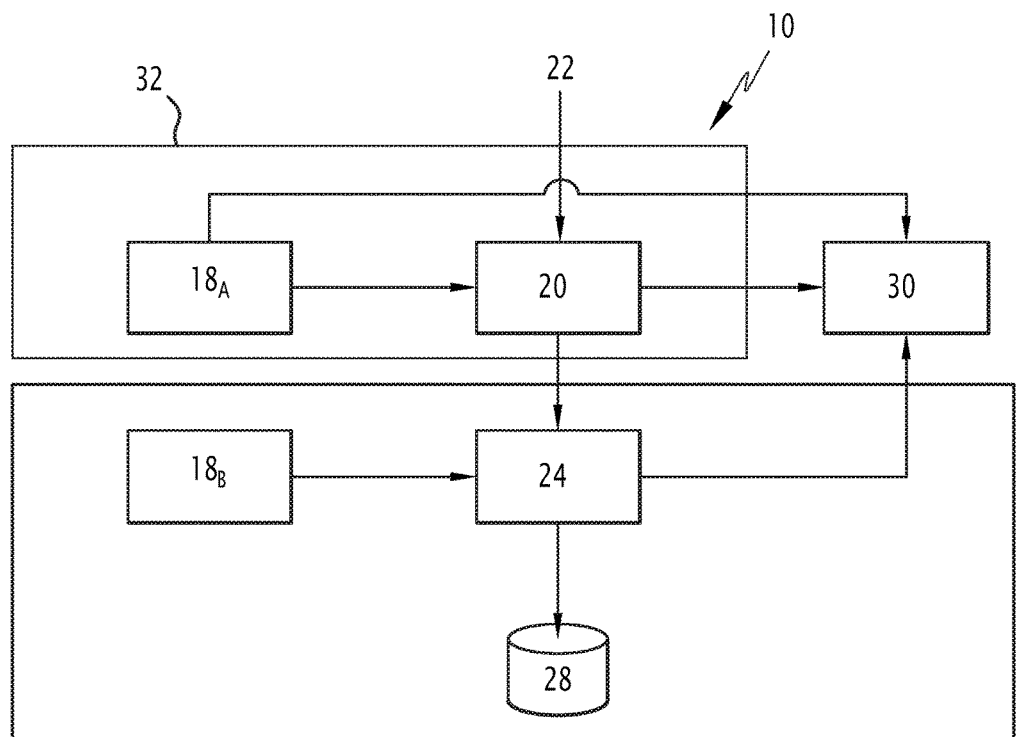

More specifically, the detection module 14 is capable of carrying out an error detection function according to at least two separate embodiments, depending on whether the error detection is based on the states of the avionics devices once the action(s) of the crew is or are acknowledged as illustrated by the structural variants of detection and alert systems of FIGS. 2 and 3, or whether the error detection system is based on the nature of the command(s) received in real time by the crew as illustrated by the structural variants of the detection and alert systems of FIGS. 4 to 8.

According to a first embodiment, called "detect and recover" as illustrated by FIGS. 2 and 3, the detection module 14 is capable of signaling an incorrect action or an oversight in the performance of a procedure being carried out, the avionics procedure being of the "normal" type, i.e., for example relative to landing of the aircraft, or a procedure of the "abnormal" type relative to the processing of a failure of an avionics device.

To that end, the detection and alert system 10 is capable of being structured according to a first alternative in an "integrated structure", for example multi-instantiated, as shown in FIG. 2, in other words where the majority of the modules making up the detection and alert system according to the described technology are integrated within a same housing (i.e., assembly) 17.

More specifically, such a detection and alert system 10 comprises a piece of equipment 18 for monitoring states of the avionics device(s) of the aircraft in real time and a piece of equipment 20 for managing avionics procedures, these two pieces of the equipment 18 and 20 forming the monitoring module 12 previously indicated in connection with FIG. 1.

The equipment 18 for monitoring states of the avionics device(s) in real time is capable of providing, in real time, alerts, events, received commands and states associated with the avionics devices of the aircraft on the one hand to the equipment 20 for managing avionics procedures, which in turn is capable of receiving, as input, the actions from the crew 22, and on the other hand events and states associated with the avionics devices of the aircraft to the error detection equipment 24, i.e., for detecting a break in the sequence representative of the procedure being performed.

Furthermore, the equipment 20 for managing avionics procedures is capable of providing the error detection equipment 24 with the identifier of the avionics procedure being performed (or to be performed) as well as the associated action sequence.

In other words, according to the alternative embodiment of FIG. 2, the error detection equipment 24 makes up the detection module 14 of FIG. 1.

More specifically, the error detection equipment 24 is capable of comparing, using a comparator, not shown, real-time states of one or several avionics device(s) of the aircraft to at least one of the following elements:

a set of prohibited states, associated with the predetermined avionics procedure, and stored in a first dedicated memory space;

a set of expected states, based on the performance moment of the sequence representative of the predetermined avionics procedure, the set of expected states being stored in a second dedicated memory space.

According to the illustration of FIG. 2, the first dedicated memory space and the second dedicated memory space are stored within a database 28 of the detection and alert system 10 according to the described technology.

Furthermore, the error detection equipment 24 and the equipment 18 for monitoring received states and/or commands are both capable of being connected to the screen 30 of the retrieval module 16 for at least one piece of information representative of the break in sequence of FIG. 1.

According to one alternative, the screen 30 is an existing screen of the aircraft. According to another alternative, the screen 30 is dedicated to the detection and alert system 10 of the described technology.

In particular, the equipment 18 for monitoring received states and/or commands is capable of sending, for retrieval on the screen 30 by the crew 22, the alerts, events and states of one or several monitored avionics devices detected in real time.

The error detection equipment 24 is in turn capable of retrieving a representative piece of information that, when the result of the comparison of the real-time states with the set of prohibited states from the database 28 provided by the comparator is positive, corresponds to a first alert comprising a first triplet of data respectively representative of the predetermined procedure, the detected prohibited state from among the real-time states, and a recommended command to be performed to overcome the detected prohibited state, or when the result of the comparison of the real-time states with the set of expected states from the database 28 provided by the comparator is negative, corresponds to a second alert comprising a second triplet of data respectively representative of the predetermined procedure, the missing expected state from among the real-time states, and a recommended command to be performed in order to offset the missing expected state or to reiterate at least one command associated with at least one previous state from the predetermined procedure.

Hereinafter, "positive" refers, in terms of comparison, for example to the fact that one of the real-time states of one or several avionics devices is a prohibited state. Negative refers, in terms of comparison, for example to the fact that one of the real-time states of one or several avionics devices does not correspond to an expected state, or that one of the expected states at the performance moment of the procedure is missing from among the monitored real-time states.

According to another particular aspect, in the first and/or second dedicated memory space of the database 28, each respectively prohibited and/or expected state is automatically associated with a criticality level on which the more or less significant number of events to be monitored and feared events depends.

In the database 28, a criticality level defined according to a prioritized classification going from "major" (the lowest criticality level) to the intermediate criticality level of "hazardous" to "catastrophic" (the highest criticality level) is used to classify the errors.

In connection with FIG. 3, another alternative of this first embodiment is shown in which, unlike the structure of the detection and alert system of FIG. 2, the detection and alert system structure of FIG. 3 is "distributed" in at least two separate housings (i.e., assemblies) 32 and 34 each comprising a piece of real-time state monitoring equipment $18_A$ and $18_B$ of the avionics device(s) of the aircraft.

In other words, according to this distributed structure, separate equipment assemblies 32 and 34, optionally each multi-instantiated, are implemented to provide a fine segregation making it possible to increase the security level of the detection and alert system 10.

According to a second embodiment, called "preclude and recover" as illustrated by FIGS. 4 to 8, the detection module 14 is capable of precluding the performance of an incorrect action resulting from an inappropriate choice by the crew 22 or a fault of a failure processing system, not shown.

Such an embodiment assumes an overall avionics architecture of the aircraft integrating an automated management system of the avionics devices and owing to which the crew 22 no longer acts directly on the avionics devices of the aircraft. In other words, in such an architecture, all of the commands that the crew 22 carries out are triggered via one or several on board systems (and not directly by the crew 22) capable of sending commands to the external and avionics systems ("utilities").

Figure 4:
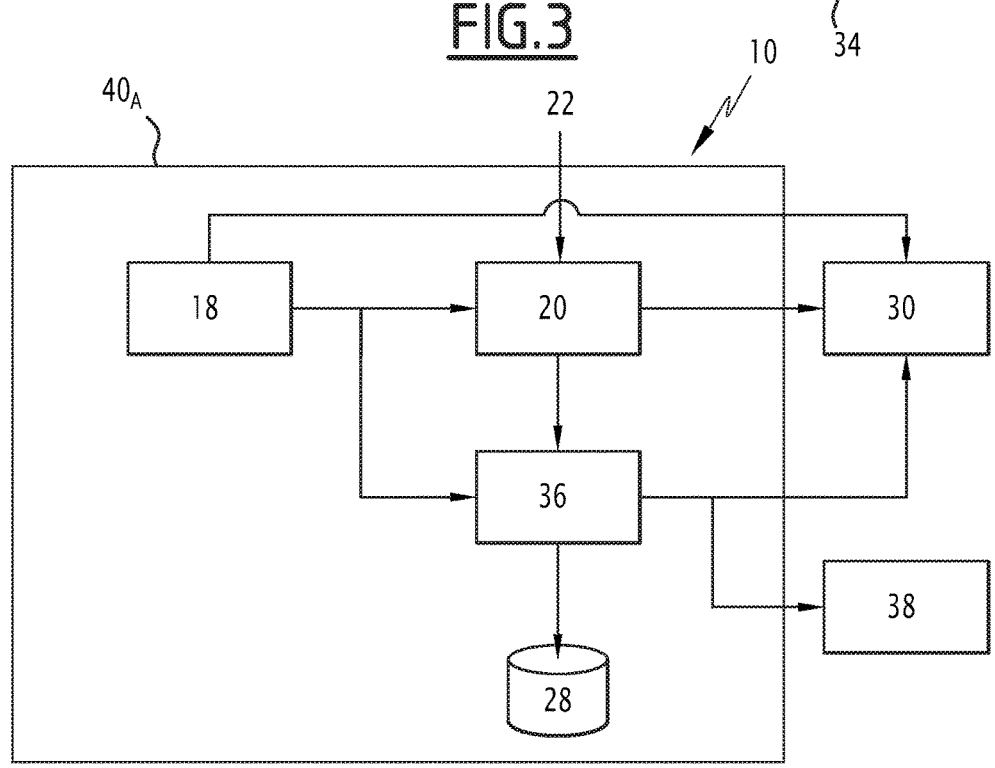
FIGS. 4 to 8 are illustrations of five alternatives of a detection and alert system of an aircraft according to a second embodiment of the described technology.
Figure 5:
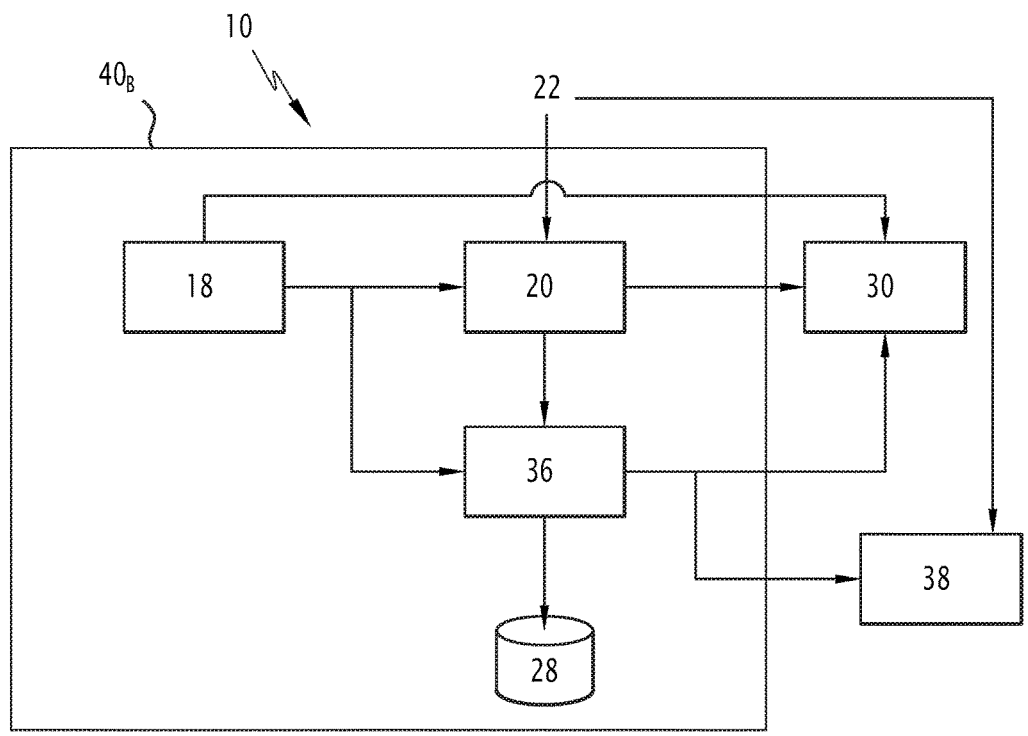

Like for the first embodiment previously described, according to the second embodiment, the detection and alert system 10 is also capable of being structured according to two first alternatives in an "integrated structure", for example multi-instantiated, as shown in FIGS. 4 and 5, in other words where the majority of the modules making up the detection and alert system 10 according to the described technology are integrated within a same housing (i.e., assembly) 40A in FIGS. 4 and 40B in FIG. 5.

In terms of structure, the integrated detection and alert systems of FIGS. 4 and 5 differ from that of FIG. 2 by the nature of the error detection equipment 36 more specifically specific to the "preclude and recover" embodiment.

Indeed, the error detection equipment 36 is capable of comparing the commands received in real time, and provided by the monitoring equipment 18, with a set of expected commands, based on the performance moment of the sequence representative of the predetermined avionics procedure, the set of expected commands being stored in a third dedicated memory space of the database 28.

Furthermore, the error detection equipment 36, in case of negative comparison of the commands received in real time and the set of expected commands, is capable of acting on the processing of the received commands before they are performed by retrieving, on the screen 30, a piece of representative information for example corresponding to a third alert comprising a third triplet of data respectively representative of the predetermined procedure, an unexpected command and/or a missing command from among the commands received in real time, and a recommended command to be carried out to overcome the unexpected and/or missing command.

Furthermore, the error detection equipment 36 is specifically capable of implementing a time delay for the performance of the unexpected command by retrieving a confirmation request for the unexpected command from the crew 22 on the screen 30, and/or a time delay for the retrieval of the information representative of the break in sequence, by sending a request to enter the missing command.

In connection with FIG. 4, and based on the action implemented by the crew 22, the error detection equipment 36 is capable of directly delivering the unexpected command confirmed (i.e., validated) by the crew 22 and/or the missing command entered by the crew 22 on a command system 38. Such a command system 38 is not necessarily a system commanded as such; for example it involves a gateway, of the relay type, or an actuator making it possible to control the target avionics device indirectly.

Alternatively, in connection with FIG. 5, the error detection equipment 36 is capable of authorizing or not authorizing the unexpected command and/or the missing command sent by the crew 22 to the command system 38.

In other words, in this detection and alert system 10 architecture of the second "preclude and recover" embodiment, either, as shown in FIG. 4, the received command corresponds to an expected command sent directly by the detection and alert system 10 to a target command system 38, or, as shown in FIG. 5, the command sent directly by the crew 22 to the command system 38 is authorized, or not in case of divergence with respect to an expected command, by the detection and alert system 10.

Thus, in the first case of FIG. 4, the detection and alert system 10 avoids the errors by the crew 22 by only directly sending the received commands that are compliant with the expected commands of the database 28 or at the very least confirmed by the crew 22, and in the second case of FIG. 5, the detection and alert system 10 avoids the errors of the crew, as well as the errors that may be generated during the production of the commands (i.e., errors due to a system failure and not an error by the crew 22.

Figure 6:
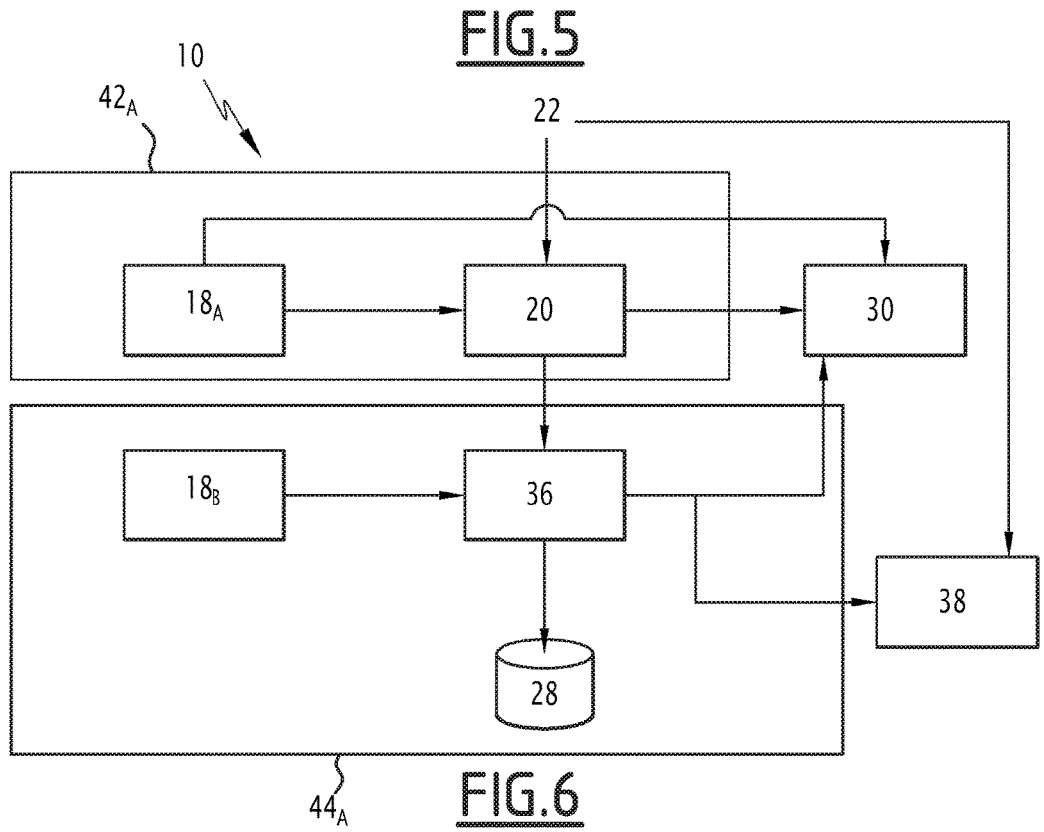
Figure 7:
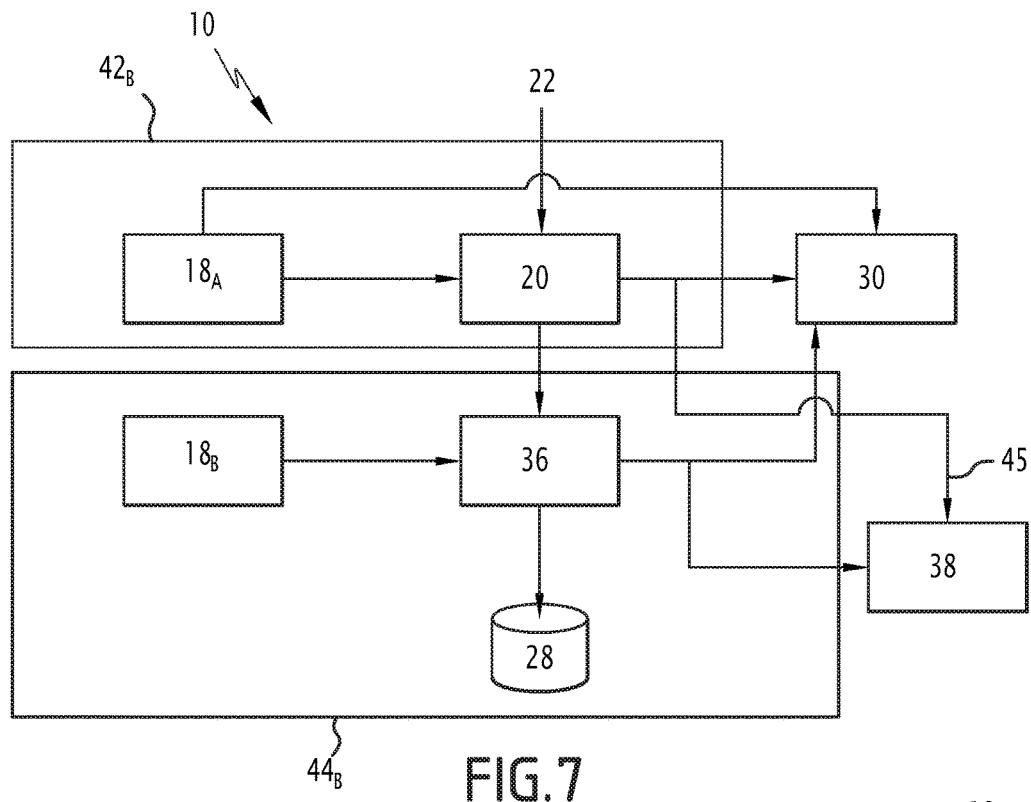
Figure 8:
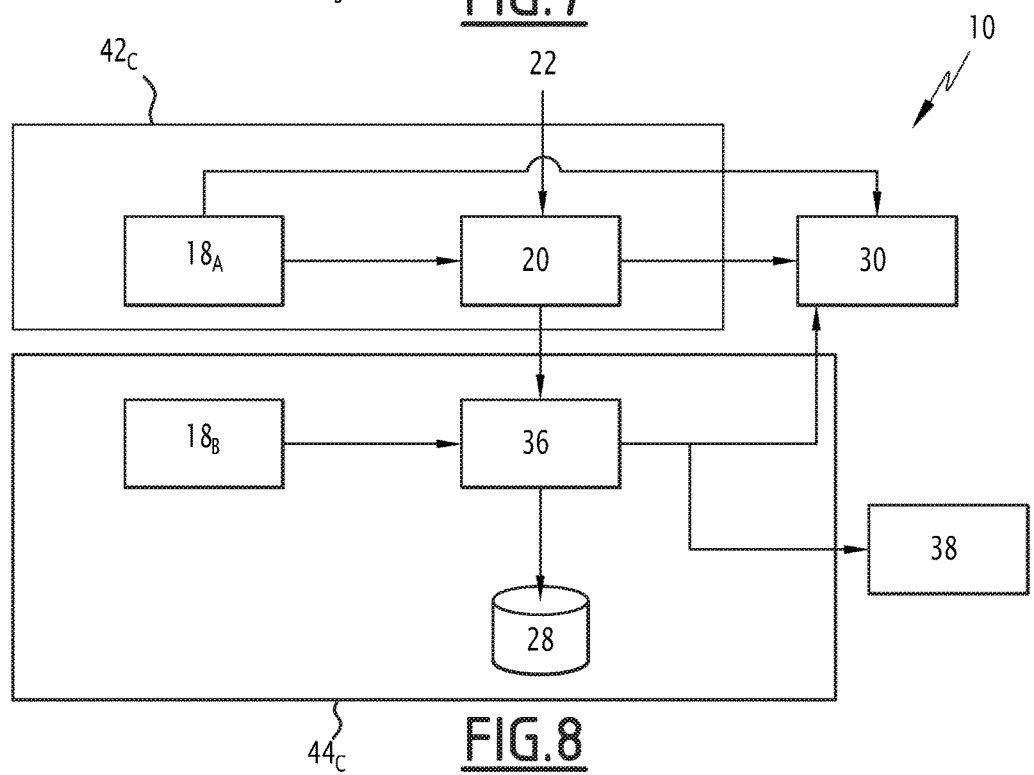

FIGS. 6 to 8 illustrate different alternatives of a distributed architecture, i.e., distributed in separate housings 42, 44 (i.e., assemblies), which may or may not be multi-instantiated, of the detection and alert system 10 according to the second embodiment.

More specifically, the alternative of FIG. 6 is the structure distributed in the housings 42A and 44A corresponding to the integrated structure of FIG. 5.

FIG. 7 shows an alternative to the distributed architecture of FIG. 6, the distribution of which is distributed within housings 42B and 44B, and in which the equipment 20 for managing avionics procedures is capable of centralizing and resending the commands from the crew, via the wireless or wired connection 45, to the command system 38.

The alternative of FIG. 8 is in turn the structure distributed in the housings 42C and 44C corresponding to the integrated structure of FIG. 5. In other words, according to this structure, the error detection equipment 36 is capable of centralizing and resending the commands received from the crew 22.

Thus, according to all of the examples of detection and alert system 10 architectures illustrated by FIGS. 2 to 8, compared with the traditional detection and alert systems, the detection and alert system 10 according to the described technology comprises or is capable of being connected to a database 28 consulted in real time to detect the command errors.

According to one particular aspect, the implementation of one or the other of the two embodiments previously described is able to be selected using a selection tool, not shown, of the detection and alert system according to the described technology, for example a pushbutton or a switch able to be activated manually or remotely via a wireless link.

In connection with FIGS. 9 to 12, the method for processing an error when performing a predetermined avionics procedure according to the described technology is described below.

In general, the method comprises three main steps, namely a step 46 for monitoring the operation of one or several avionics device(s) of the aircraft, the monitoring 46 being based on tracking a sequence representative of the predetermined avionics procedure being carried out, a step 48 for detecting a break in the sequence due to an incorrect command (for example entered by the crew or resulting from an automaton performing the sequence associated with the procedure, in place of the crew 22) and/or skipping of at least one expected command according to the predetermined avionics procedure being performed, and a step 50 for retrieving at least one piece of information representative of said break in sequence.

FIGS. 9 and 11 show two embodiments of the method according to the described technology including alternatives of the main steps 46, 48 and 50 previously cited.

Figure 10:
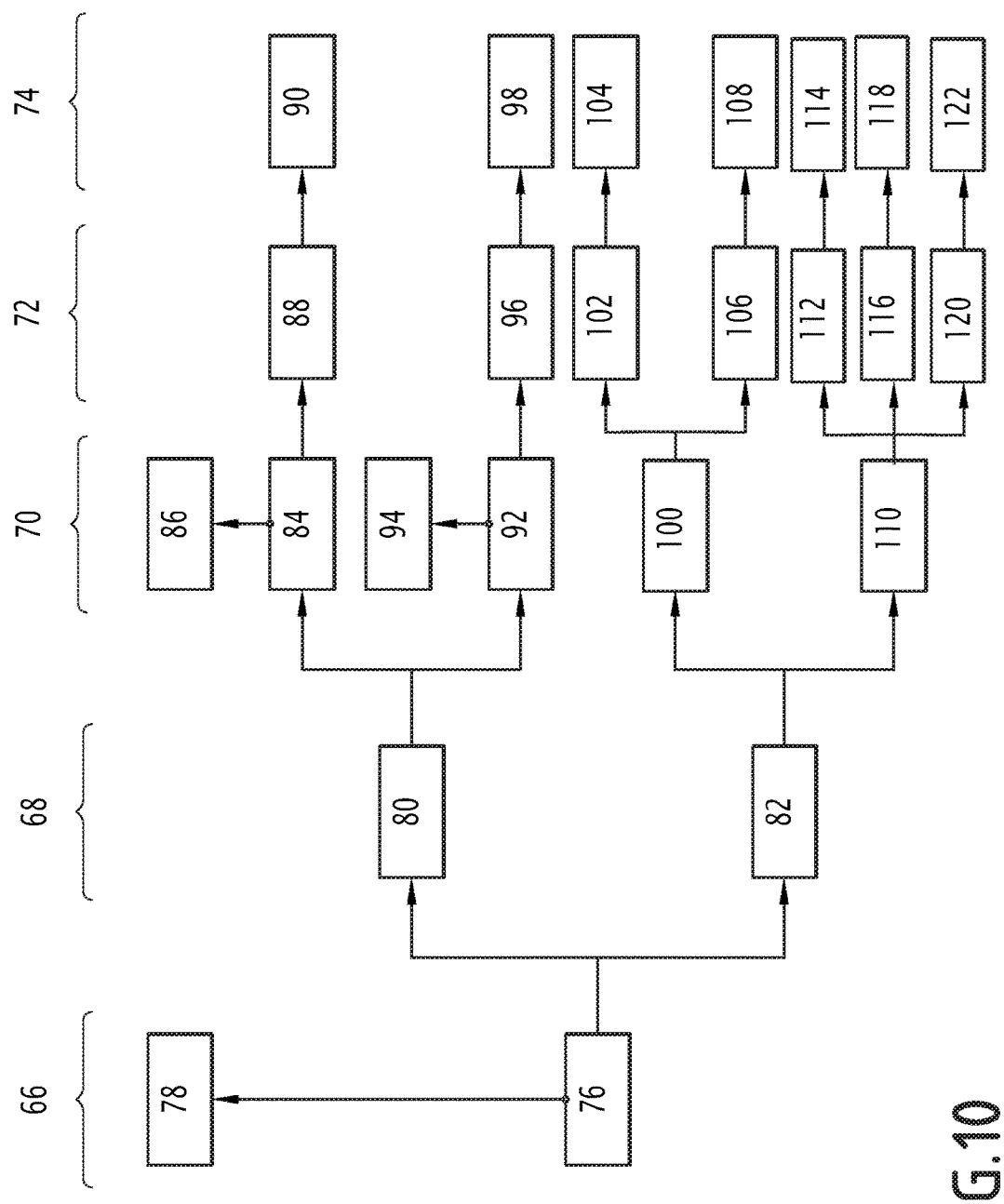
Figure 12:
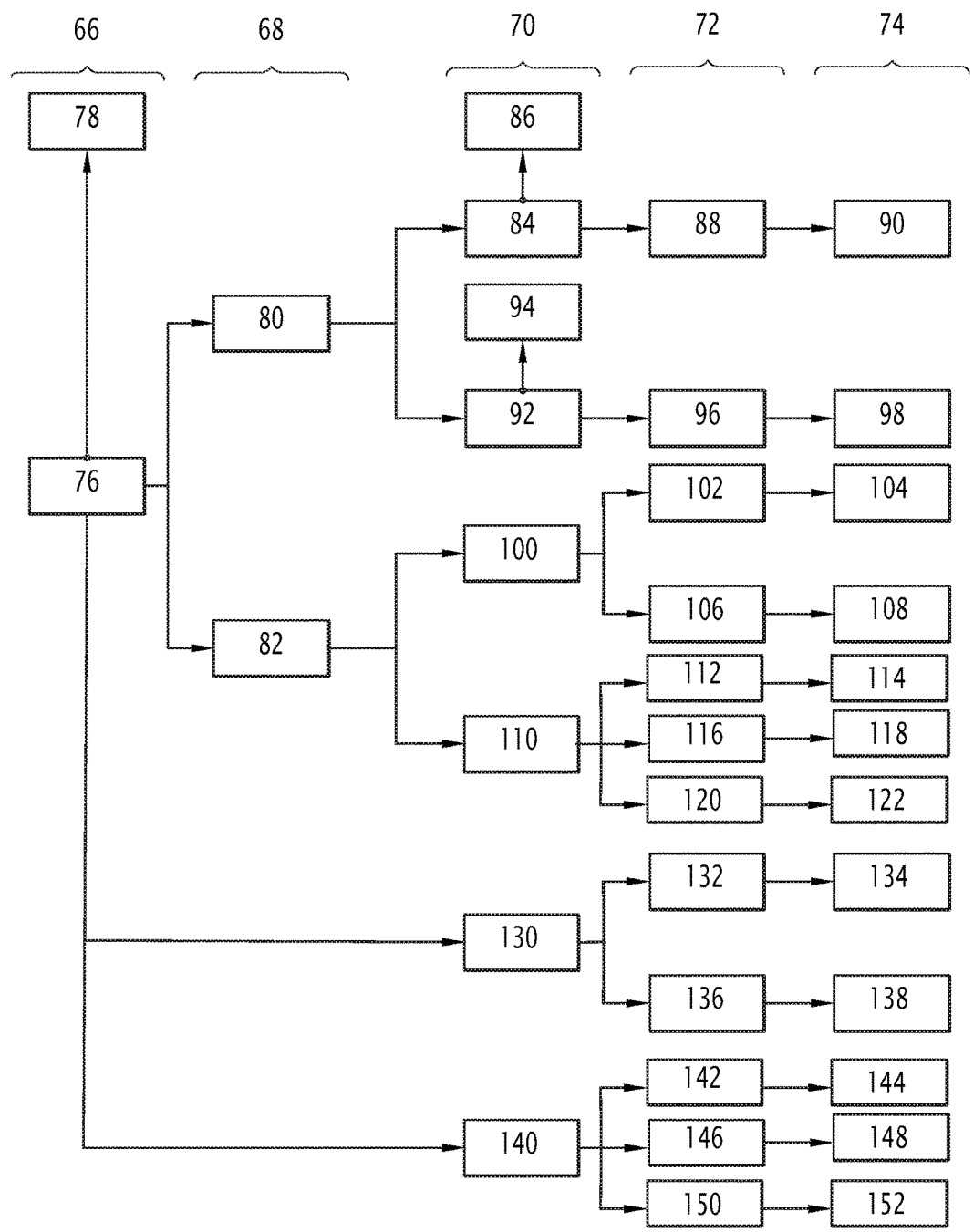

More generally, each avionics procedure is stored and retrieved by the equipment 20 for managing (i.e., tracking) the procedure previously described in the form of a sequence of actions that the crew 22 must carry out. FIGS. 10 and 12 respectively illustrate a data set associated with an avionics procedure to be used in order to detect a command error according to two embodiments of the described technology.

In connection with FIG. 9, the method is described according to the first "detect and recover" embodiment, the associated detection and alert system of which is illustrated by FIGS. 2 and 3.

More specifically, according to this first embodiment, the step 46 for monitoring the operation of one or several avionics device(s) of the aircraft on the one hand comprises a step 52 for monitoring real-time states of the avionics device(s) and a step 54 for tracking a sequence representative of the predetermined avionics procedure being carried out. According to this first embodiment, the sequence relates to the list of states of the avionics devices to be monitored as the procedure progresses.

Then, according to this first embodiment, the step 48 for detecting a break in the sequence associated with the avionics procedure being performed comprises either a step 58 for comparing real-time states of one or several avionics device(s) of the aircraft to a set of prohibited states, associated with the predetermined avionics procedure, and stored in a first dedicated memory space of the database 28 previously described, or a step 58 for comparing real-time states of one or several avionics device(s) of the aircraft to a set of expected states, based on the performance moment of the sequence representative of the predetermined avionics procedure, the set of expected states being stored in a second dedicated memory space of the database 28, or the two comparison steps 58 and 60.

According to this first embodiment, the step 50 for retrieving at least one piece of information representative of said break in sequence respectively comprises, for each comparison step 58 and/or 60 previously cited:

when the comparison 58 of the real-time states and the set of prohibited states is positive, the retrieved representative information corresponds to the retrieval 62 of a first alert comprising a first triplet of data respectively representative of the predetermined procedure (e.g., an identifier), the detected prohibited states from among the real-time states, and a recommended command to be performed in order to overcome the detected prohibited state;

when the comparison of the real-time states and the set of expected states is negative, the retrieved representative information corresponds to the retrieval 64 of a second alert comprising a second triplet of data respectively representative of the predetermined procedure, the missing expected state from among the real-time states, and a recommended command to be performed in order to overcome the missing expected state or to reiterate at least one command associated with at least one previous step of the predetermined procedure.

In other words, according to this first embodiment, as the avionics procedure being performed advances, when an event occurs on one of the monitored avionics devices, according to the inventive method, the knowledge database 28 is accessed and the monitoring by comparison to the feared events related thereto is implemented to guarantee that the procedure unfolds correctly.

When one of the feared events associated with a feared system event is detected, the error message specific thereto is automatically shown to the crew 22 in order to alert the latter to the fact that it is in the process of committing an error and/or that a failure in interpreting its command is present, and/or to present the crew with the list of actions remaining to be performed to overcome this error.

Optionally, according to a prior step that is not shown, for example during the design of the aircraft, the method comprises the construction, for example by machine learning or by implementing an inference engine from safety analyses of the aircraft, of the database 28 comprising at least one of the first, second and third dedicated memory spaces previously cited.

More specifically, the database 28 is a knowledge database of the monitored events according to the described technology and associated with a predetermined procedure. The safety analyses define the feared events and combinations of feared events and associate a criticality level with them. In other words, to avoid a human and/or machine error, system failure states are associated with the commands from which they may originate. Internal system failures are therefore precluded.

In connection with FIG. 10, the software structure of the data set associated with a predetermined avionics procedure stored in the database 28, for example an avionics procedure triggered in case of the loss of an engine on an aircraft corresponding to a twin-engine airplane, is shown.

The software structure of FIG. 10 is a reference base structure (i.e., each type of data is only defined therein once for simplification reasons) and is organized in the form of a logic association, also called dependency tree, between at least five types of data, namely events to be monitored, the associated feared events 68, the associated characteristics 70 of the aircraft, the associated commands 72 and the corresponding messages 74 retrieved for the crew.

Such a structure in reference base form makes it possible to avoid definition redundancy and provide coherence between the procedures and how they are monitored.

By way of illustration, according to the example of FIG. 10, the events 66 to be monitored are the cutoff 76 of the first engine and, as a result, the detection 78 of the failure of this first engine. When the first engine is cut off 76, the associated feared events 78, which are considered to be catastrophic, their combination being able to cause the loss of the vehicle, are a cutoff 80 of the fuel supply of the second engine or a cutoff 82 of the second engine.

When the fuel supply of the second engine is cut off 80, two types of avionics characteristics 70 are associated, namely:

on the one hand, the supply 84 of the second engine by the main pump, which amounts to the detection of the on state 86 of the main pump and the off state of the secondary pump, the associated feared command 72 is then the turning off 88 of the main pump and the message associated with the expected action to resolve this 74 is the turning on 90 of the main pump, and on the other hand, the supply 92 of the second engine by the secondary pump, which amounts to the detection of the on state 94 of the secondary pump and the off state of the main pump, the associated feared command 72 is then the turning off 96 of the secondary pump and the associated message 74 to resolve this is the turning on 98 of the secondary pump.

When the second engine is cut off 82, two types of avionics characteristics 70 are associated, namely:

on the one hand, the turning off 100 of the second engine, the associated feared command 72 is then on the one hand the adjusting 102 of the power lever of the second engine on a flight idle (FI) and the associated message 74 to resolve this is turning the second engine back on 104, and on the other hand the adjusting 106 of the control lever of the second engine on the fuel cutoff, and the message associated with the expected action 74 is also turning the second engine back on 108;

on the other hand, the securing 110 of the second engine, the associated feared command 72 is then of three types: the establishment 112 of the management power of the second engine on the "maximum continuous thrust" (MCT) level, the adjustment 116 of the power lever of the second engine on a flight idle, or the adjustment 120 of the control lever of the second engine on the fuel cutoff and the associated message 74 to resolve each of these three types of feared commands 72 is turning the second engine back on 114, 118, 122.

Optionally, such a dependency tree is further conditioned by the flight phase in progress at the time of the performance by the crew 22 of the predetermined procedure such that the avionics characteristics 70 and the associated feared commands 72 are reconfigurable in the database 28 based on the flight phase (i.e., landing, takeoff, turning, etc.).

All of the data associated with an avionics procedure implemented in case of complete loss of the communication capability, also stored in the database 28, is capable of being organized similarly to the example of FIG. 10 previously described. The implementation of such a procedure is also major in terms of criticality, since it causes a work overload for the crew.

In connection with FIG. 11, the method is described according to the second "preclude and recover" embodiment, the associated detection and alert system of which is illustrated by FIGS. 4 to 8.

More specifically, according to this second embodiment, the step 46 for monitoring the operation of one or several avionics device(s) of the aircraft on the one hand comprises a step 123 for monitoring commands received in real time by said avionics device(s) and step 54 for tracking a sequence representative of the predetermined avionics procedure being carried out. According to said second embodiment, the sequence relates to the list of commands to be carried out in order to process the procedure, and not the list of states of the avionics devices associated with the first embodiment. The list of commands associated with a procedure will for example be sent as follows, specifying the maximum amount of time for the implementation of the command: command 1: engine shut off 1; engine securing 1; 30 s), command 2 (engine shut off 1; extinguisher triggering 1; 10 s), command 3 (engine shutoff 1; controlling stopping of the engine fire 1; 10 s); command 4 (electrical reversion; ignition of the auxiliary power unit (APU); 10 s). Other alternatives of command descriptions are usable in particular in global and macroscopic form in case of non-ambiguity, for example: command 1 (Engine Shutoff 1; 50 s), command 2 (Electrical reversion; 30 s), etc.

Then, according to this second embodiment, step 48 for detecting a break in the sequence associated with the avionics procedure being performed comprises a step 124 for comparing commands received in real-time with a set of expected commands, based on the performance moment of the sequence representative of the predetermined avionics procedure, the set of expected commands being stored in a third dedicated memory space of the database 28 previously described.

According to this second embodiment, the later retrieval step 50 comprises, when the comparison 124 of the commands received in real time and the set of expected commands is negative, a forming/retrieval step 126 of the representative information corresponding to a third alert comprising, for example, a third triplet of data respectively representative of the predetermined procedure, an unexpected command and/or a missing command from among the commands received in real time, and a recommended command to be performed to offset the unexpected and/or missing command.

Furthermore, the later retrieval step 50 also comprises a time delay 128 for the performance of the unexpected command by retrieving a confirmation request for the unexpected command from the crew, and/or for the retrieval of the information representative of the break in sequence, by sending a request to enter the missing command.

In other words, according to this second embodiment, over the course of the detection of the commands entered by the crew 22, the method according to said second embodiment monitors the progression of the performance of the list of commands associated with the avionics procedure to be tracked. If a command is detected 124 that does not correspond to the procedure, the command is not sent directly to the receiving avionics device, but a confirmation is requested beforehand from the crew 22 in order to ensure that the divergent command in question indeed corresponds to its intended use. Likewise, if an expected command identified in the command list associated with the procedure to be tracked is not carried out at the end of the time associated with it, the detection 124 carried out according to this second embodiment will escalate a message to the crew 22 to make sure that this is not an oversight.

According to one completely automated alternative, this second embodiment is in particular capable of being carried out to further trigger/correct, automatically, the various expected commands when there is no reaction from the crew 22, and/or to assist the crew 22 in a stressful situation, and/or to monitor the proper performance of the avionics procedure to be performed, whether it is controlled using only the inventive method or in combination with one or several systems.

In connection with FIG. 12, the software structure of the data set associated with a predetermined avionics procedure stored in the database 28 implemented according to this second embodiment is also shown. As previously indicated, this software structure is similar to that implemented according to the first embodiment. For example, FIG. 12 also shows, according to the second embodiment, the dependency tree associated with an avionics procedure triggered in case of loss of an engine on the aircraft corresponding to a twin-engine airplane. Compared with FIG. 10, the reference tree of FIG. 12 comprises additional avionics characteristics 70 to be monitored related to the loss of the first engine, these characteristics this time not being related to a feared event but determining the expected commands 72 to be monitored, namely:

on the one hand, the turning off 130 of the first engine, the associated expected command 72 is then on the one hand the adjusting 132 of the power lever of the first engine on a flight idle (FI) and the associated message 74 retrieved for the crew 22 to accomplish this action is stopping the first engine 134, and on the other hand the adjusting 136 of the control lever of the first engine on the fuel cutoff, and the associated message 74 is also the stopping 138 of the first engine;

on the other hand, the securing 140 of the first engine, the associated expected command 72 is then of three types: the establishment 112 of the management power of the first engine on the "maximum continuous thrust" (MCT) level, the adjustment 116 of the power lever of the first engine on a flight idle, or the adjustment 120 of the control lever of the first engine on the fuel cutoff and the associated message 74 to resolve each of these three types of expected commands 72 is the stopping 144, 148, 152 of the first engine.

One can thus see that the described technology proposes at least to make it possible to detect and correct an incorrect action by automatically assisting the crew in the detection of the performance of an incorrect action, by showing it that a break in sequence has occurred in the procedure, if applicable further explaining the cause of the break in sequence to the crew, and also helping the crew resolve this break (taking into account the priority between the correction of the incorrect action and the need to resume the procedure).

Furthermore, according to a second embodiment, subject to the implementation of a particular system architecture where the crew does not act directly on the avionics devices to be controlled, the performance of the incorrect command by the crew 22 is able to be avoided (i.e., the incorrect command is filtered) to thus prevent the deterioration in flight safety.

The described technology thus allows significant time savings in the taking into account and correction of the incorrect command by the crew 22.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of processing an error when performing a predetermined avionics procedure, the method being carried out automatically by a detection and alert system of an aircraft, the method comprising:
   monitoring the operation of one or several avionics device(s) of the aircraft, the monitoring based on tracking a sequence representative of the predetermined avionics procedure being carried out;
   detecting a break of the sequence due to an incorrect command and/or due to a skipping of at least one expected command according to the predetermined avionics procedure being performed;
   retrieving at least one piece of information representative of the break in the sequence; and
   monitoring the operation of one or several avionics device(s) of the aircraft corresponding to the monitoring of real-time states of the avionics device(s); the detecting comprising a comparison of the real-time states of one or several avionics device(s) of the aircraft with at least one of the following elements:
      a set of prohibited states, associated with the predetermined avionics procedure, and stored in a first dedicated memory space, and
      a set of expected states, based on the performance moment of the sequence representative of the avionics procedure, the set of expected states being stored in a second dedicated memory space;
   when the comparison of the real-time states and the set of prohibited states is positive, the retrieved representative information corresponds to a first alert comprising a first triplet of data respectively representative of:
      the predetermined procedure,
      the detected prohibited state from among the real-time states, and
      a command to be performed recommended to offset the detected prohibited state,
   or wherein the monitoring of the operation of one or several avionics device(s) of the aircraft corresponds to the monitoring of commands received in real time by the avionics device(s), and wherein the detecting comprises a comparison of the commands received in real time with a set of expected commands, based on the performance moment of the sequence representative of the predetermined avionics procedure, the set of expected commands being stored in a third dedicated memory space.

2. The method according to claim 1, wherein when the comparing of the real-time states and the set of expected states is negative, the retrieved representative information corresponds to a second alert comprising a second triplet of data respectively representative of:
   the predetermined procedure,
   the missing expected state from among the real-time states, and
   a recommended command to be performed to overcome the missing expected state or to reiterate at least one command associated with at least one previous step of the predetermined procedure.

3. The method according to claim 1, wherein, in the first and/or second dedicated memory spaces, each respectively prohibited and/or expected state is automatically associated with a criticality level.

4. The method according to claim 1, when the comparison of the commands received in real time and the set of expected commands is negative, the retrieved representative information corresponds to a third alert comprising a third triplet of data respectively representative of:
   the predetermined procedure,
   an unexpected command and/or a missing command from among the commands received in real time, and
   a command to be performed recommended to offset the unexpected and/or missing command,
   and wherein the method further comprises a time delay for:
      the performance of the unexpected command by retrieving a confirmation request for the unexpected command from the crew, and/or
      the retrieval of the information representative of the break in the sequence, by sending a request to enter the missing command.

5. The method according to claim 1, wherein the method comprises building a database comprising at least one of the first, second, third dedicated memory spaces, by automatic learning or by implementing an inference engine.

6. A computer program product comprising software instructions which, when implemented by an information processing unit integrated into a detection and alert system of an aircraft, implements a processing method of processing an error when performing a predetermined avionics procedure, the method being carried out automatically by a detection and alert system of an aircraft, the method comprising:
   monitoring the operation of one or several avionics device(s) of the aircraft, the monitoring based on tracking a sequence representative of the predetermined avionics procedure being carried out;
   detecting a break of the sequence due to an incorrect command and/or due to a skipping of at least one expected command according to the predetermined avionics procedure being performed;
   retrieving at least one piece of information representative of the break in the sequence; and
   monitoring the operation of one or several avionics device(s) of the aircraft corresponding to the monitoring of real-time states of the avionics device(s); the detecting comprising a comparison of the real-time states of one or several avionics device(s) of the aircraft with at least one of the following elements:
      a set of prohibited states, associated with the predetermined avionics procedure, and stored in a first dedicated memory space, and
      a set of expected states, based on the performance moment of the sequence representative of the avionics procedure, the set of expected states being stored in a second dedicated memory space;
   when the comparison of the real-time states and the set of prohibited states is positive, the retrieved representative information corresponds to a first alert comprising a first triplet of data respectively representative of:
      the predetermined procedure,
      the detected prohibited state from among the real-time states, and
      a command to be performed recommended to offset the detected prohibited state,
   or wherein the monitoring of the operation of one or several avionics device(s) of the aircraft corresponds to the monitoring of commands received in real time by the avionics device(s), and wherein the detecting comprises a comparison of the commands received in real time with a set of expected commands, based on the performance moment of the sequence representative of the predetermined avionics procedure, the set of expected commands being stored in a third dedicated memory space.

7. A detection and alert system of an aircraft comprising:
a module for monitoring the operation of one or several avionics device(s) of the aircraft and for tracking a sequence representative of a predetermined avionics procedure being carried out,
wherein the detection and alert system is configured to process an error during the performance of the predetermined avionics procedure, and further comprises:
a module for detecting a break of the sequence due to an incorrect command and/or due to a skipping of at least one expected command according to the predetermined avionics procedure being performed, and
a module for retrieving at least one piece of information representative of the break in the sequence,
the monitoring of the operation of one or several avionics device(s) of the aircraft, implemented by the monitoring module, corresponding to the monitoring of real-time states of the avionics device(s), and the detection, carried out by the detection module, comprising a comparison of the real-time states of one or several avionics device(s) of the aircraft with at least one of the following elements:
a set of prohibited states, associated with the predetermined avionics procedure, and stored in a first dedicated memory space, and
a set of expected states, based on the performance moment of the sequence representative of the avionics procedure, the set of expected states being stored in a second dedicated memory space,
and when the comparison of the real-time states and the set of prohibited states is positive, the retrieved representative information corresponds to a first alert comprising a first triplet of data respectively representative of:
the predetermined procedure,
the detected prohibited state from among the real-time states, and
a command to be performed recommended to offset the detected prohibited state,
or wherein the monitoring of the operation of one or several avionics device(s) of the aircraft, carried out by the monitoring module, corresponds to the monitoring of commands received in real time by the avionics device(s), and wherein the detection, carried out by the detection module, comprises a comparison of the commands received in real time with a set of expected commands, based on the performance moment of the sequence representative of the predetermined avionics procedure, the set of expected commands being stored in a third dedicated memory space.

* * * * *